(12) United States Patent
Kelly

(10) Patent No.: US 6,931,176 B2
(45) Date of Patent: Aug. 16, 2005

(54) RECONFIGURABLE OPTICAL ADD/DROP MULTIPLEXER WITH BURIED DISPERSION COMPENSATION MODULE

(75) Inventor: Colin Geoffrey Kelly, Ottawa (CA)

(73) Assignee: Tropic Networks Inc., Kanata (CA)

( * ) Notice: Subject to any disclaimer, the term of this patent is extended or adjusted under 35 U.S.C. 154(b) by 125 days.

(21) Appl. No.: 10/636,664

(22) Filed: Aug. 8, 2003

(65) Prior Publication Data

US 2004/0101236 A1 May 27, 2004

Related U.S. Application Data

(60) Provisional application No. 60/427,960, filed on Nov. 21, 2002.

(51) Int. Cl.[7] .............................. G02B 6/28; H04J 14/02; H04B 10/12
(52) U.S. Cl. ............................ 385/24; 398/81; 398/147
(58) Field of Search ............................... 385/24; 398/81, 398/147

(56) References Cited

U.S. PATENT DOCUMENTS

| | | | |
|---|---|---|---|
| 5,905,838 A * | 5/1999 | Judy et al. ................... 385/123 |
| 6,122,418 A | 9/2000 | Ellis | |
| 6,370,300 B1 * | 4/2002 | Eggleton et al. ............... 385/37 |
| 2002/0021862 A1 * | 2/2002 | Zhou et al. .................... 385/24 |
| 2003/0026529 A1 * | 2/2003 | Durkin et al. ................. 385/24 |

OTHER PUBLICATIONS

"Dispersion Compensating, Reconfigurable Optical Add/Drop Multiplexer Using Chirped Fibre Bragg Gratings", Ellis, A.D., et al, Electronic Letters, IEE Stevenage, GB, vol. 33.
No. 17, Aug. 14, 1997.

* cited by examiner

*Primary Examiner*—Akm Enayet Ullah
*Assistant Examiner*—James D. Stein
(74) *Attorney, Agent, or Firm*—Victoria Donnelly

(57) ABSTRACT

Apparatuses and methods are provided for chromatic dispersion compensation of wavelength division multiplexed (WDM) optical signals within an optical add/drop multiplexer (OADM) and especially within a remotely reconfigurable add/drop multiplexer (RROADM). The arrangement is especially useful in metro or regional networks where RROADMs can be dynamically reconfigured to deliver signals from any node to any other node. A dispersion compensation module (DCM) is located in the multiplexed through path of the RROADM between the drop module and the add module such that only wavelengths passing through the RROADM are compensated and shorter optical paths traversing only one span between adjacent nodes are not compensated. This allows lower cost static DCMs to be used, allows more flexibility in DCM values and allows fewer DCMs to be used while maintaining dispersion limits.

13 Claims, 3 Drawing Sheets

US 6,931,176 B2

RECONFIGURABLE OPTICAL ADD/DROP MULTIPLEXER WITH BURIED DISPERSION COMPENSATION MODULE

RELATED APPLICATION

This application claims benefit from U.S. Provisional patent application Ser. No. 60/427,960 to Kelly, C. G., entitled "Reconfigurable Optical Add/Drop Multiplexer with Buried Dispersion Compensation Module", and filed on 21 Nov. 2002.

FIELD OF THE INVENTION

This invention relates generally to wavelength division multiplexed optical transport in telecommunications networks and in particular, to chromatic dispersion compensation.

BACKGROUND OF THE INVENTION

Recent advances in optical networking have led to the development of reconfigurable optical add/drop multiplexers (ROADMs) and remotely reconfigurable optical add/drop multiplexers (RROADMs), which provide carriers with the ability to remotely select one or more wavelengths sent from any node to any other node on a core ring. This simplifies and reduces the amount of planning and provisioning work required.

FIG. 1 illustrates a generic prior art RROADM based node 100 having two RROADMs 101 and 101a, wherein optical fibers 103 and 103a carry wavelength division multiplexed (WDM) optical signals from an adjacent node and optical fibers 105 and 105a carry the WDM signals around a network to the next adjacent node. Typically, nodes are arranged in a ring configuration with a RROADM (101 and 101a) configured for each direction.

Each generic RROADM implementation 101 and 101a includes an optical drop module 107 where one or more selected wavelengths of the WDM signal are received at input port 104 and diverted to drop port 111. The WDM optical signal containing the remaining wavelengths which have not been diverted, continue on through path 113 to add module 115 where one or more selected wavelengths from add port 117 are combined with the WDM optical signal on the through path and presented to output port 119. In a remotely reconfigurable OADM (RROADM), selection of wavelengths to add and drop can be controlled remotely.

In many implementations of RROADMs, RROADM through losses and/or fiber losses are sufficient to require an ingress optical amplifier 121 at the RROADM input and an egress optical amplifier 123 at the RROADM output.

In optical fibers, waveforms of signals broaden over long distances as a result of chromatic dispersion. This phenomenon increases as network speeds and span lengths increase and can result in transmission errors if the transponder dispersion tolerance is exceeded.

Many optical networks require span lengths beyond the dispersion tolerance of WDM transponders and therefore the chromatic dispersion of the fibers require compensation. This is typically achieved through the use of dispersion compensation modules (DCMs) having a fixed amount of compensation (for example 20, 40, 60 or 80 km). For long haul networks, both static and reconfigurable, per span compensation is required, most spans requiring multiple DCMs.

FIG. 2 illustrates a prior art RROADM implementation where dispersion compensation is required. The node 200 of FIG. 2 uses RROADMs 101 and 101a of FIG. 1, with the addition of DCMs 201 and 203. DCM 201 provides dispersion compensation on the incoming span 103 (and 103a). DCM 203 provides dispersion compensation on the outgoing span 105 (and 105a). In practice either DCM 201 or DCM 203 or both are used depending on the amount of dispersion compensation required, the compensation values of the DCMs available and other network planning requirements. In most RROADM architectures, the optical losses in the DCMs require additional optical amplification as shown by associated optical amplifiers 205 and 207.

In some installations, the DCM 203 can be installed before the egress amplifier 123 and can obviate the need for additional amplifier 207. It is also possible to install DCM 201 between the ingress amplifier 121 and input port 104 although this can have a detrimental effect on optical signal-to-noise ratios (OSNR).

Metro and regional networks have quite different dispersion issues compared to long haul networks. In metro/regional networks, many spans may be too short to require individual span compensation but longer signal paths traversing multiple spans often exceed transponder dispersion limits. This problem becomes more noticeable when exploiting the ability to remotely reconfigure RROADMS to route wavelengths from any source to any destination, without exceeding total dispersion limits for the signal paths. Transponder dispersion limits have both positive and negative bounds (for example, −20 to +80 km, of equivalent SMF-28 fiber dispersion). It is therefore important not to overcompensate a signal path. Maximum dispersion compensation on any span is limited, so that for example, on a span of 25 km, a maximum allowable compensation would be 45 km to remain within transponder minimum dispersion limit of −20 km. Generally, average compensation values over multiple spans must remain close to the average span lengths, so that signal paths traversing multiple spans have dispersion within transponder dispersion limits. Traditionally, metro/regional networks use tuneable DCMs or adaptive dispersion compensation to ensure dispersion remains within limits while still being able to accommodate the flexibility of any node to any node signal routing. On the other hand, if static DCMs are used, many small value DCMs are needed so as not to overcompensate signals traversing only a single span.

These traditional techniques have the disadvantage of being costly to implement. Tuneable DCMs and adaptive dispersion compensation are much more costly than static DCMs.

It is therefore desirable to avoid using expensive tuneable and adaptive DCMs and to use static DCMs if possible, and to minimize the number of DCMs used. As well, it is desirable to minimize the number of different value static DCMs required, in order to reduce inventory requirements.

SUMMARY OF THE INVENTION

It is therefore an object of the present invention to overcome the aforementioned disadvantages of the prior art. Accordingly, apparatuses are provided for improved dispersion management arrangements, especially for remotely reconfigurable optical add/drop multiplexers (RROADMs).

In general terms, the present invention provides a RROADM with a buried dispersion compensation module (DCM) which provides dispersion compensation only to WDM signals which pass through the RROADM. Thus, single span signal paths are not subject to compensation.

One broad aspect of the present invention provides an optical add/drop multiplexer (OADM) having an input port, an output port, an optical through path, an optical drop module, an optical add module and a dispersion compensation module. The input port is for receiving a wavelength division multiplexed (WDM) optical signal. The output port is for passing the WDM optical signal from the OADM. The optical through path is for carrying the WDM optical signal from the input port to the output port. The optical drop module is adapted to receive the WDM optical signal from the input port and to divert one or more wavelengths of the WDM optical signal to the drop port. The optical add module is for adding one or more wavelengths from the add port to the WDM optical signal at the output port. The dispersion compensation module is positioned in the optical through path between the drop module and the add module, and is adapted to compensate for dispersion in the WDM optical signal passing through the through path.

In some embodiments, the dispersion compensation module is adapted to compensate for variable chromatic dispersion.

In some embodiments, of the present invention, the dispersion compensation module is adapted to compensate for fixed chromatic dispersion.

In some embodiments, the OADM is a reconfigurable OADM.

In some embodiments, the OADM is a remotely reconfigurable OADM.

In some embodiments, the OADM is based on a broadcast and select architecture.

In some embodiments, the OADM is based on a wavelength blocker architecture.

In some embodiments, the OADM has an east/west architecture.

In some embodiments, the OADM further comprises an optical amplifier at the input port.

In some embodiments, the OADM further comprises an optical amplifier at the output port.

Another aspect of the present invention provides an optical network node having at least one OADM as described above.

Another aspect of the present invention provides an optical network having at least one optical network node as described above.

Some embodiments provide an optical network wherein alternate nodes have an OADM as described above.

In some embodiments, the network has short spans.

In some embodiments, the network is a metro network.

Another broad aspect of the present invention provides a method of dispersion compensation in an optical add/drop multiplexer (OADM) having an input port, an output port and an optical through path therebetween. The method has steps of receiving a wavelength division multiplexed (WDM) optical signal at the input port, diverting one or more wavelengths of the WDM optical signal to a drop port; performing dispersion compensation on the WDM optical signal remaining in the through path and adding one or more wavelengths from an add port to the WDM optical signal at the output port.

BRIEF DESCRIPTION OF THE DRAWINGS

Further features and advantages of the present invention will become apparent from the following detailed description, taken in combination with the appended drawings in which.

DESCRIPTION OF THE PREFERRED EMBODIMENTS

Figure 1:
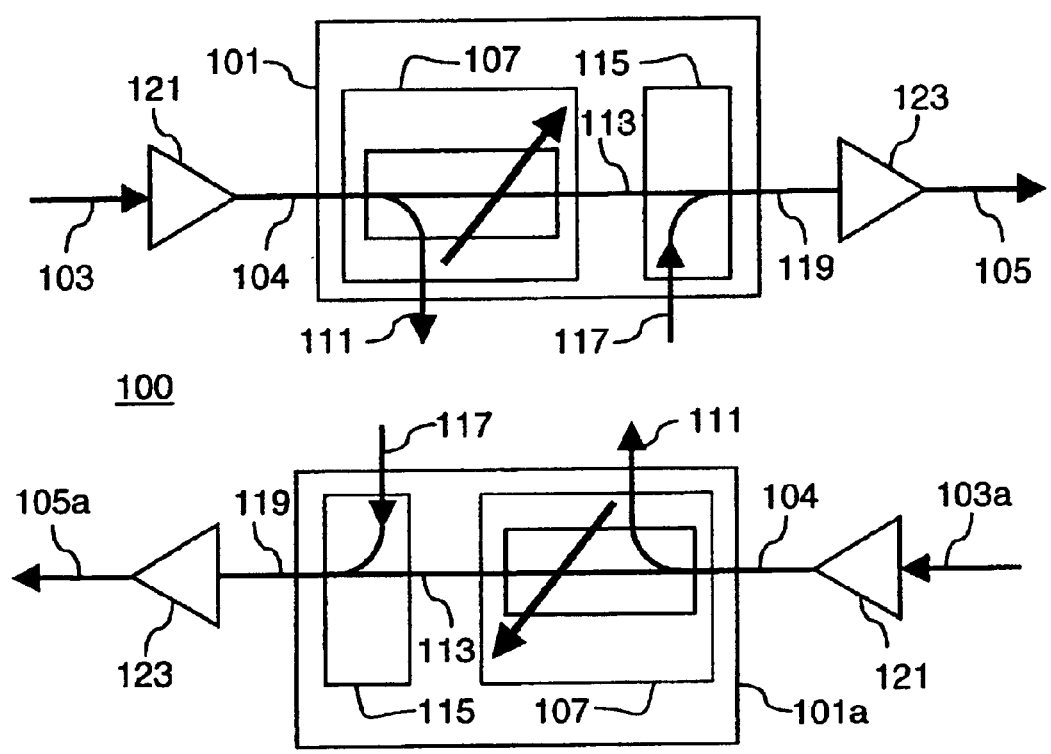
FIG. 1 is a diagram illustrating a prior art remotely reconfigurable optical add/drop multiplexer (RROADM) node.
Figure 2:
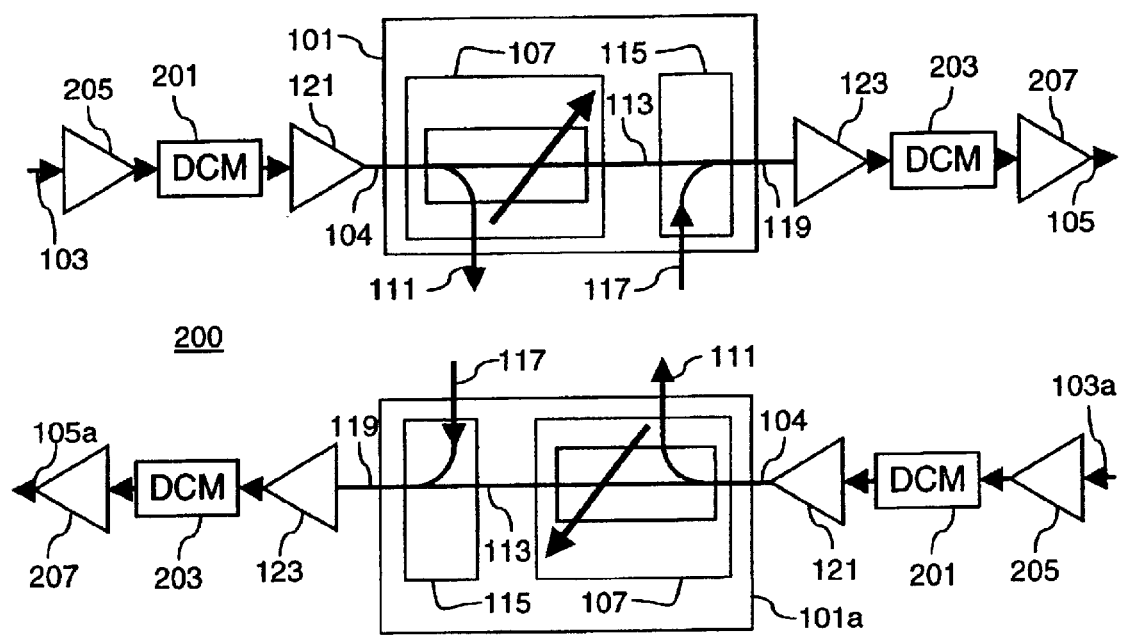
FIG. 2 is a diagram illustrating a prior art reconfigurable optical add/drop multiplexer (OADM) node with traditional span dispersion compensation.
Figure 3:
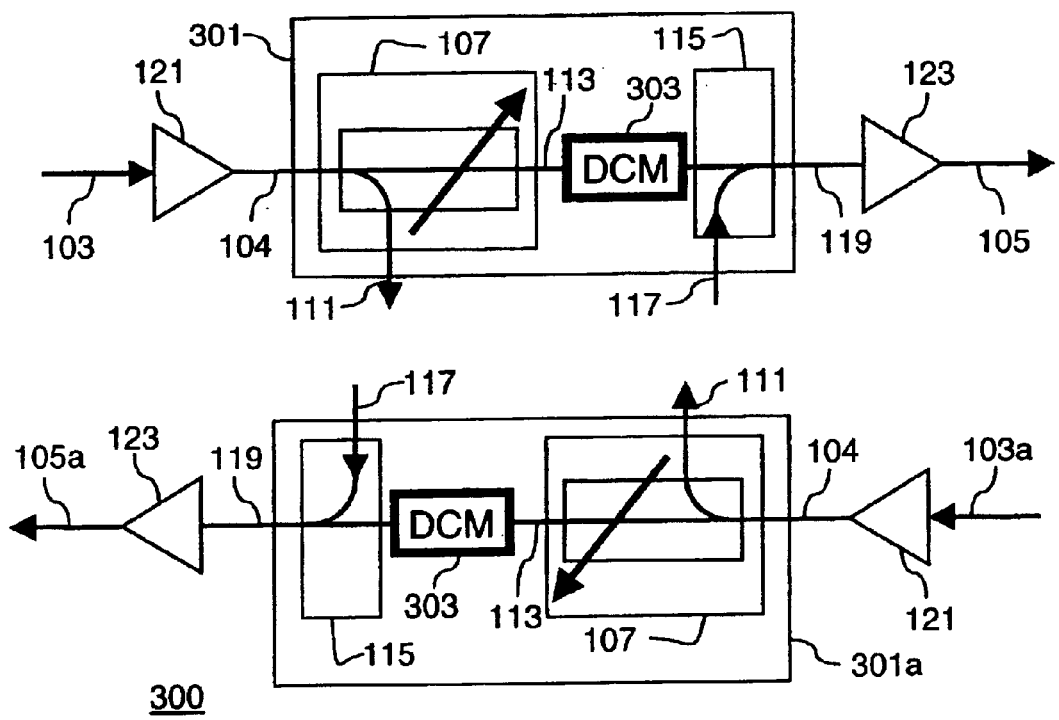
FIG. 3 is a diagram illustrating a RROADM based node having buried DCMs in accordance with an embodiment of the invention.

FIG. 3 illustrates a RROADM based node 300 having buried DCMs 303 in accordance with an embodiment of the invention. The node 300 has two RROADMs 301 and 301a similar to the RROADMs 101 and 101a of FIG. 1, with the exception of the DCMs buried inside the RROADMs. Thus optical fibers 103 and 103a carry wavelength division multiplexed (WDM) optical signals from an adjacent node and optical fibers 105 and 105a carry the WDM optical signals around a network to the next adjacent node. An optical drop module 107 receives the WDM optical signal at input port 104 and diverts one or more selected wavelengths of the WDM signal to drop port 111. The WDM optical signal containing the remaining wavelengths, which have not been diverted, continue on the through path 113. DCM 303 applies dispersion compensation to these remaining wavelengths in the multiplexed optical signal and presents the compensated signal to add module 115 where one or more selected wavelengths from add port 117 are combined with the compensated WDM optical signal on the through path and presented to output port 119. In a remotely reconfigurable OADM (RROADM), selection of wavelengths to add and drop can be controlled remotely. This arrangement of the DCM permits the DCM to compensate optical signals passing through the node and not compensate dropped and added signals (the selected added/dropped wavelengths or channels) at the node. Thus, optical signals whose signal path is a single span between two nodes will not be compensated. This permits larger values of compensation to be used in the DCM, thereby reducing the number of DCMs required in a metro or regional network and increasing the flexibility of DCM values and DCM placement. For example, DCMs can be selected from a limited set of standard values (e.g. 20, 40, 60, or 80 kilometers of compensation) and buried in only every second node.

Typical RROADMs have an optical amplifier 121 at the RROADM input and an optical amplifier 123 at the RROADM output. In many cases, these RROADMs can accommodate the buried DCMs 303 without the need for additional amplifiers.

Figure 4:
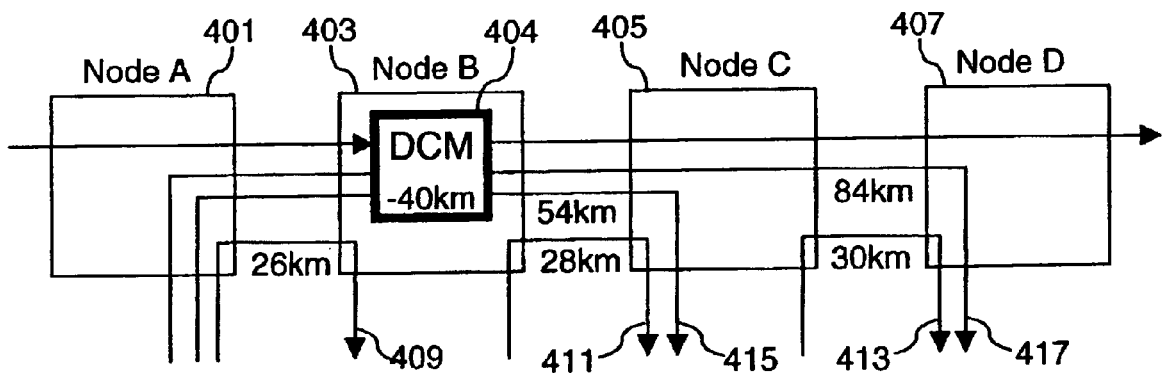
FIG. 4 is a diagram illustrating part of an optical network showing a ROADM in accordance with an embodiment of the present invention.

FIG. 4 illustrates the use of buried compensation in part of an optical network 400 in accordance with an embodiment of the present invention. Network 400 has OADM nodes "A" 401, "B" 403, "C" 405 and "D" 407 connected via optical fibers. Node "B" 403 has a buried DCM 404 with a dispersion compensation of −40 km. Path 409 from Node A 401 to Node B 403 does not pass through DCM 404 and the dispersion of 26 km is thus not compensated, but well within acceptable dispersion limits. Likewise, path 411 from Node B 403 to Node C 405 has an uncompensated dispersion of 28 km and path 413 from Node C 405 to Node D 407 has an uncompensated dispersion of 30 km. Path 415 from Node A 401 to Node C 405 does pass through DCM 404 and thus the dispersion of 54 km is compensated by −40 km to produce an effective dispersion of 14 km for the path. Path 417 from Node A 401 to Node D 407 also passes through DCM 404 and thus the dispersion of 84 km is compensated by −40 km to produce an effective dispersion of 44 km for the path.

This invention does not preclude the use of traditional span compensation and in fact combining buried compensation and span compensation can be useful when some spans in a metro network are much longer than others.

The present invention is well suited for use with reconfigurable OADMs (ROADMs) and especially for use with remotely reconfigurable OADMs (RROADMs). The invention can also be used with various other types of OADMs having a multiplexed through path. Examples of such OADMS include OADMs based on broadcast and select architectures using wavelength blockers.

The present invention is well suited to use with static DCMs having standard compensation values, however, the invention can also be used with various other DCMs, such as tuneable and adaptive DCMs. This can be useful, for example, when an optical network evolves or is reconfigured and the original compensation values are no longer sufficient, static DCMs can be replaced with other DCMs or other types of DCMs.

It will be apparent to those skilled in the art that modifications to the above embodiments can occur without deviating from the scope of the present invention. Accordingly, the disclosures and descriptions herein are intended to be illustrative, but not limiting, of the scope of the invention which is set forth in the following claims.

What is claimed is:

1. An optical add/drop multiplexer (OADM) inside a node in an optical network with a buried dispersion compensation module, the OADM comprising:
    an OADM input port for receiving a wavelength division multiplexed (WDM) optical signal;
    an OADM output port for passing the WDM optical signal from the OADM;
    an optical through path for carrying the WDM optical signal from the OADM input port to the OADM output port inside the node;
    an optical drop module inside the node for receiving the WDM optical signal from the OADM input port and to divert one or more wavelengths of the WDM optical signal to an OADM drop port;
    an optical add module for adding one or more wavelengths from an OADM add port to the WDM optical signal at the OADM output port; and
    a dispersion compensation module positioned in the optical through path between the optical drop module and the optical add module inside the node adapted to compensate only for dispersion in the WDM optical signal passing through the through path inside the node.

2. An OADM as claimed in claim 1, wherein the dispersion compensation module is adapted to compensate for chromatic dispersion.

3. An OADM as claimed in claim 1, wherein the dispersion compensation module is adapted to compensate for dispersion at a fixed value.

4. An OADM as claimed in claim 1, wherein the OADM is a reconfigurable OADM (ROADM).

5. An OADM as claimed in claim 4, wherein the OADM is a remotely reconfigurable OADM (RROADM).

6. An OADM as claimed in claim 1, wherein the OADM further comprises an optical amplifier at the input port.

7. An OADM as claimed in claim 9, wherein the OADM further comprises an optical amplifier at the output port.

8. An optical network node comprising at least one OADM according to claim 1.

9. An optical network comprising at least one optical network node according to claim 8.

10. An optical network wherein alternate nodes comprise an optical add/drop multiplexer (OADM) comprising:
    an input port for receiving a wavelength division multiplexed (WDM) optical signal;
    an output port for passing the WDM optical signal from the OADM;
    an optical through path for carrying the WDM optical signal from the input port to the output port;
    an optical drop module adapted to receive the WDM optical signal from the input port and to divert one or more wavelengths of the WDM optical signal to a drop port;
    an optical add module for adding one or more wavelengths from an add port to the WDM optical signal at the output port; and
    a dispersion compensation module positioned in the optical through path between the drop module and the add module, adapted to compensate for dispersion in the WDM optical signal passing through the through path.

11. An optical network as claimed in claim 10, wherein the network has short spans.

12. An optical network as claimed in claim 10, wherein the network is a metro network.

13. A method of dispersion compensation in an optical add/drop multiplexer (OADM) inside a node in an optical network, the OADM having an input port, an output port and an optical through path there between, the method comprising steps of:
    receiving a wavelength division multiplexed (WDM) optical signal at the input port;
    diverting one or more wavelengths of the WDM optical signal to a drop port;
    performing dispersion compensation on the WDM optical signal remaining in the through path only; and
    adding one or more wavelengths from an add port to the WDM optical signal at the output port.

* * * * *